Jan. 5, 1954   A. L. CATFORD ET AL   2,664,957
CONTROL SYSTEM FOR AIRCRAFT PROPULSION POWER PLANTS,
INCLUDING A RECIPROCATING INTERNAL-COMBUSTION
ENGINE AND AN EXHAUST DRIVEN TURBINE
Filed Oct. 26, 1951   5 Sheets-Sheet 1

FIG.1.

Inventor
ADRIAN L. CATFORD
and REGINALD H.D. CHAMBERLIN
By
Emery, Holcombe & Blair
Attorney

Jan. 5, 1954 A. L. CATFORD ET AL 2,664,957
CONTROL SYSTEM FOR AIRCRAFT PROPULSION POWER PLANTS,
INCLUDING A RECIPROCATING INTERNAL-COMBUSTION
ENGINE AND AN EXHAUST DRIVEN TURBINE
Filed Oct. 26, 1951 5 Sheets-Sheet 2

Inventor
ADRIAN L. CATFORD
and REGINALD H.D. CHAMBERLIN
By
Emery, Holcombe & Blair
Attorney

FIG.4.

Jan. 5, 1954 A. L. CATFORD ET AL 2,664,957
CONTROL SYSTEM FOR AIRCRAFT PROPULSION POWER PLANTS,
INCLUDING A RECIPROCATING INTERNAL-COMBUSTION
ENGINE AND AN EXHAUST DRIVEN TURBINE
Filed Oct. 26, 1951 5 Sheets-Sheet 5

*Inventor*
ADRIAN L. CATFORD
and REGINALD H. D. CHAMBERLIN
By Emery, Holcombe & Blair
*Attorney*

UNITED STATES PATENT OFFICE 2,664,957

CONTROL SYSTEM FOR AIRCRAFT PROPULSION POWER PLANTS, INCLUDING A RECIPROCATING INTERNAL - COMBUSTION ENGINE AND AN EXHAUST DRIVEN TURBINE

Adrian Leslie Catford, Hampton, and Reginald Henry Douglas Chamberlin, Ealing, London, England, assignors to D. Napier & Son Limited, London, England, a company of Great Britain Application October 26, 1951, Serial No. 253,298

Claims priority, application Great Britain October 31, 1950

7 Claims. (Cl. 170—135.28)

This invention relates to control systems for aircraft propulsion power plants of the kind comprising a reciprocating internal combustion engine driving a constant speed airscrew, and an exhaust driven turbine the rotor of which is not directly connected to the crankshaft or crankshafts of the internal combustion engine, but is arranged to drive a compressor for supplying combustion air to the internal combustion engine and also to deliver power to an airscrew.

The terms "turbine" and "compressor" used herein are to be interpreted as including two or more turbines and two or more compressors including the case where one turbine drives an airscrew and another a compressor.

For convenience it will be assumed that a single exhaust driven turbine drives a single compressor, and an airscrew, and the exhaust driven turbine and the compressor it drives will herein be referred to as the turbo-blower while the term "constant speed airscrew" is to be understood to have its usual meaning of a variable pitch airscrew having associated with it speed responsive governing mechanism which at any setting thereof controls the pitch of the airscrew automatically to keep the speed of the airscrew substantially constant, and control mechanism by which the setting of the governing mechanism and hence the speed at which the airscrew is maintained can be varied.

The object of the invention is to provide an improved control system for aircraft propulsion power plants of the above kind which will tend to ensure satisfactory control of the power plant as a whole throughout its working range in a manner providing for efficiency and tending to prevent surging.

A control system for an aircraft propulsion power plant of the above kind according to one feature of the present invention includes boost control mechanism responsive to the pressure of combustion air supplied to the internal combustion engine, for controlling automatically the speed of the turbo-blower by varying the load imposed upon it other than by the compressor in a manner tending to maintain the combustion air supply at constant pressure for any given setting of the boost control mechanism, and a main control member arranged to control simultaneously the setting of the boost control mechanism, the fuel supply to the internal combustion engine, the setting of the governor of the constant speed airscrew driven by the internal combustion engine, and the setting of a stop device arranged to limit the movement of the mechanism controlling the speed of the turbo-blower in a direction to increase that speed and thereby to impose a speed limit on the turbo-blower to prevent its speed rising above a maximum dependent upon the setting of the main control member.

It will thus be seen that the main control which will usually be under the manual control of the pilot, will simultaneously control (a) the speed setting of a constant speed airscrew driven by the internal combustion engine, (b) the setting of the fuel supply apparatus of the internal combustion engine, (c) the boost pressure to be maintained below the critical altitude at each setting of the main control member and (d) the maximum speed which the turbo-compressor can attain at that setting.

It is thus possible not only to ensure that, at every setting of the main control member, the boost pressure maintained, the fuel injection setting and the speeds of the internal combustion engine and the turbo-blower are satisfactory for efficiency and economy at the total power appropriate to that setting, but that nevertheless, if conditions should arise in which the mechanism controlling the speed of the turbo-blower to maintain the set boost should attempt to increase the turbo-blower speed to one which at the particular setting in question might give rise to surging, this increase is prevented by the stop device. Moreover, the movement of the stop is itself limited so that in the position in which it permits maximum turbine speed, that speed is still within safe limits.

According to a further preferred feature of the invention, means are provided whereby when the boost pressure at any setting drops due to an increase in altitude after the stop mechanism has come into operation, that is to say at altitudes above the critical altitude, the fuel control mechanism is automatically adjusted to reduce the supply of fuel to the internal combustion engine, thus preventing fuel being delivered in excess of that which can be consumed by the combustion air.

The invention is applicable to power plants of the kind referred to whether the turbo-blower supplies air to the internal combustion engine directly or through a further compressor driven mechanically by the internal combustion engine. The invention is, however, particularly applicable to power plants of the kind referred to in which the compressor of the turbo-blower is of the multi-stage axial flow type and delivers air to the intake of a centrifugal compressor driven mechanically from the internal combustion engine and delivering the air to the internal combustion engine so that the turbo-blower constitutes one or more stages of multi-stage compressing apparatus of which the centrifugal compressor constitutes the final stage. Moreover, the main control may be arranged to control the supply of fuel to one or more so called reheat chambers through which the exhaust gases pass and to which fuel may be supplied under suitable conditions for burning unburnt air in the exhaust gases and thus increasing the supply of gas to the turbine.

The invention may be carried into practice in various ways according to the form of the power plant to which it is applied and other considerations, but one particular control system according to the invention will now be described by way of example with reference to the accompanying drawings, in which.

Figure 1:
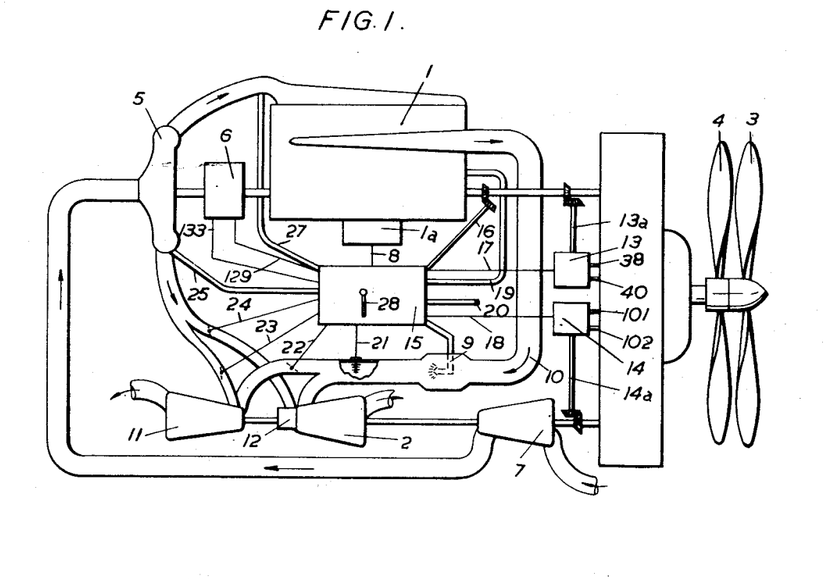
Figure 1 is a block diagram showing the interrelation between the major components of an aircraft power plant incorporating control gear according to the invention.

The power plant whose major components are shown diagrammatically in Figure 1 comprises a two-stroke compression ignition reciprocating engine 1, the fuel pumps of which are shown at 1a and the exhaust gases from which are arranged to drive an exhaust driven turbine 2, and two constant speed contra-rotating airscrews 3 and 4 driven respectively by the engine 1 and the turbine 2. The engine 1 also drives a centrifugal compressor 5 through a two-speed gear box 6, and the turbine 2 is directly coupled to an axial flow compressor 7 which is arranged to feed air to the centrifugal compressor 5. A reheat burner 9 is included in the ducting 10 which leads the exhaust gases and excess air from the engine 1 to the turbine 2, and part of the hot gases may be fed to an auxiliary gas turbine 11 under certain operating conditions. An air balance piston 12 is arranged to counterbalance the axial thrust of the turbine 2 when the auxiliary turbine is not in operation.

The airscrews 3 and 4 are of the variable pitch constant speed type, and associated with the airscrews are therefore the usual constant speed centrifugal governors 13 and 14 driven respectively from the engine crankshaft and the turbine by drives indicated at 13a and 14a.

The control mechanism for the power plant is represented diagrammatically by the block 15 in Figure 1, the external connections from the mechanism to the various elements of the power plant being as follows: an operative connection 8 to the internal combustion engine fuel injection pumps 1a, a power take-off 16 from the engine crankshaft, operative connections 17 and 18 to the two airscrew governors, a fuel intake 19, a servo oil pressure supply 20, a fuel supply pipe to the reheat burner 9, a connection to a thermometric device 21, an operative connection 22 with a valve in the gas duct leading to the auxiliary turbine 11, an operative connection 23 with a valve in a duct leading cooling air from the centrifugal compressor 5 to the auxiliary turbine, an operative connection 24 with a valve in the duct leading air from the centrifugal compressor 5 to the air balance piston 12, a supply duct 25 through which compressed air may be supplied from the centrifugal compressor 5 for cooling the reheat burners 9 when desired, operative connections 129 and 133 with the gear box 6, a connection 27 which is sensitive to the boost pressure of the combustion air entering the engine 1, and a main control lever 28.

The control mechanism, which is indicated purely diagrammatically at 15 in Figure 1, and its various associated parts are illustrated in greater detail but still somewhat diagrammatically in the remaining figures of the drawings.

Figure 2:
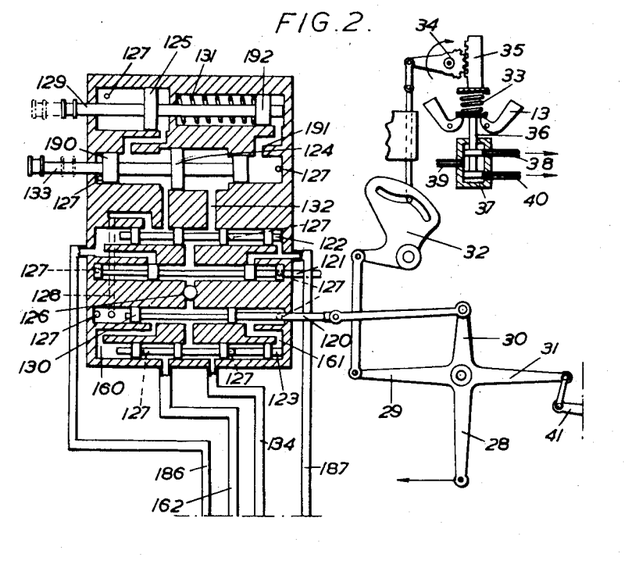
Figure 2 is a somewhat diagrammatic view of part of the control gear partly in section.

The main control lever 28 which is shown in Figure 2, is formed integral with three operating arms, 29, 30 and 31.

The arm 29 is connected to a cam 32 or other device for varying the tension of a spring 33 by means of a pinion 34 engaging a rack 35, and thus controlling the setting of the airscrew governor 13, which in turn operates the piston 36 of a hydraulic servo control valve 37 and thus in known manner varies the pitch and governs the speed of the airscrew 3, driven by the engine 1. When the hydraulic connection 38 is connected to the pressure connection 39 the pitch of the airscrew blades is coarsened, and when the connection 40 is submitted to pressure the pitch of the blades is fined.

Figure 3:
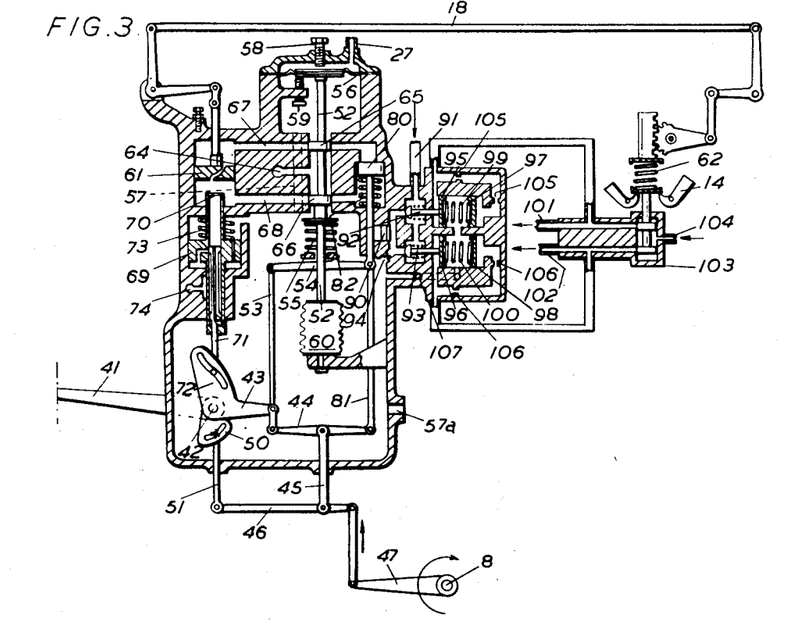
Figure 3 is a sectional view of the boost and fuel control portion of the control gear.

The operating arm 31 of the pilot's lever is connected to apparatus for controlling the boost and the fuel supply to the internal combustion engine. This combined boost and fuel control apparatus is shown in Figure 3 and is arranged as follows.

The operating arm 31 is connected to a lever 41 which is pivoted at 42 and formed with an extension 43. The extension 43 is connected to one end of a floating lever 44, and an intermediate point in the length of the lever 44 is connected by means of the link 45 to a floating fuel pump control lever 46, one end of which is connected to an arm 47 attached to the control shaft 8 of the fuel injection pumps 1a of the engine 1. A pump efficiency compensating cam 50 is also attached to the lever 41, and acts through a link 51 on one end of the floating fuel pump control lever 46, and serves to apply a correction to the setting of the fuel pump control shaft 8, to allow for falling pump efficiency with increased pump speed.

The extension 43 also acts on a boost control servo valve 52 through a link 53 connected to one end of a floating boost setting lever 54, an intermediate point in the length of the lever 54 being in contact with a boost setting spring 55 which acts directly upon the servo valve 52. The upper end of the servo valve 52 is connected to a diaphragm 56, one side of which is subject to the boost pressure through the duct 27, while the other side is subject to atmospheric pressure admitted through the passages 57 and 57a. Adjusting screws 58, 59, are provided to limit the movement of the diaphragm 56. The lower end of the boost control servo valve 52 is connected to an evacuated capsule 60, the other end of the capsule being rigidly mounted in the apparatus so that the capsule acts upon the valve in a direction which counter-balances the atmospheric pressure acting on the diaphragm 56, which is thus subject in effect only to absolute boost pressure.

The servo valve 52 constitutes part of a hydraulic servo device hereinafter called the boost control servo, by which the governor 14 of the constant speed airscrew 4 driven by the turbine 2 is controlled so that below critical altitude at any given setting the speed of the turbine is controlled to maintain constant boost. The boost control servo is of known general type and includes a boost control servo piston 61 which acts on the spring abutment 62 of the airscrew governor 14 through a linkage connection 18. Hydraulic servo fluid is supplied under pressure at 64, the external connection being via the supply passage 20 in Figure 1, and the servo valve 52 controls the supply of hydraulic fluid to and from the two sides of the piston 61 by means of the valve elements 65, 66, cooperating with the passages 67, 68. The servo piston 61 is provided with a small by-pass or leakage hole through it so that under conditions of equilibrium the servo valve maintains a predetermined flow of fluid and thus a pressure difference across the leakage hole sufficient to maintain the piston in the appropriate position.

Stop mechanism is provided to limit the movement of the boost control servo piston 61 in accordance with the maximum permitted speed of the turbine 2. This stop mechanism comprises a hydraulic servo device of the follow-up type, the piston 69 of which carries a projection 70 constituting the stop, while the servo valve 71 is moved by a cam 72 formed integral with the extension 43 on the lever 41. A spring 73 is provided to urge the piston 69 downwards so as to follow the movements of the valve 71, and hydraulic servo fluid is supplied under pressure at 74. The position of the stop 69 is thus controlled directly by the pilot's lever 28 so that for each setting of the pilot's lever and hence each setting of the speed of the internal combustion engine there is a corresponding maximum speed limit set upon the turbine. This maximum turbine speed for each speed setting of the internal combustion engine is below that at which surging might occur at altitudes below the critical altitude, and this speed is also, it will be understood, always below the absolute maximum permissible for mechanical reasons.

It will be seen that at any given setting of the pilot's control lever as an aircraft incorporating the power plant climbs and the ambient atmospheric pressure and hence the absolute boost pressure falls, the boost control servo will operate to move the servo piston 61 downwards and thus act upon the governor 14 to set the blades of the airscrew 4 to a finer pitch and thus allow the turbine 2 to speed up, until the boost pressure on the diaphragm 56 is restored and the boost control servo is thus again in equilibrium. This operation continues at each setting during climb until the maximum permitted speed of the turbine for that setting is reached, that is to say until the servo piston 61 comes up against the stop 70 at which point the critical altitude for that particular setting of the pilot's lever 28 will have been reached.

Above the critical altitude the absolute boost pressure will continue to fall, but since further increases in the speed of the turbine are not permitted, it becomes necessary to reduce the supply of fuel to the engine. For this purpose an automatic servo system, hereinafter called the falling boost servo system, is included in the mechanism. This servo system comprises a servo piston 80 connected to one end of the boost setting lever 54, and also connected by means of the link 81 with one end of the floating lever 44. When the boost control servo piston 61 comes up against the stop 70 the leakage hole through the piston is closed by the head of the stop and movements of the valve 52 and the valve element 65 in response to reductions of boost pressure cause the pressure on the upper side of the piston to be built up. The same movements of the valve 65 permit this increased pressure to be transmitted to the upper side of the piston 80, which is normally held in its upper position by a spring which exerts a greater upward thrust than the downward thrust exerted by the servo fluid at the maximum pressure which exists when the leakage hole in piston 61 is open. The piston 80 is thus forced downwards, thereby giving a downwards motion to the floating fuel pump control lever 46 and so reducing the supply of fuel to the engine 1, and at the same time displacing the lower abutment of the spring 55 to bring the spring pressure into equilibrium with the actual boost pressure. The distance through which the piston 80 moves downward is proportional to the fall in boost pressure, and by suitable choice of the dimensions of the linkage components it can be arranged that the fuel supply to the engine is adjusted to suit the actual boost pressure above critical altitude.

It will thus be seen that with the mechanism so far described movement of the pilot's lever 28 to the left in Figure 2 will cause simultaneous changes in the speed setting of the internal combustion engine 1 and its associated airscrew 3, in the fuel supply to the internal combustion engine, and in the boost setting spring 55 which, through the boost control servo system, will then maintain the boost constant at the set value below the critical altitude, and in the position of the turbine speed stop 70 to determine the maximum permissible turbine speed at that setting of the pilot's lever.

Above the critical altitude any unselected changes in the speed of the turbine driven airscrew 4, due for example to atmospheric conditions or sudden changes in aspect of the aircraft might tend to produce instability or a condition of hunting if automatic fuel changes were allowed. For this reason the falling boost servo piston 80 has associated with it mechanism for preventing or checking its movement in such circumstances.

This mechanism comprises a braking member or pad 90 which is arranged to be pressed against the rod of the falling boost servo piston 80 by means of hydraulic servo fluid admitted at 91 and controlled by two valves 92, 93. The working chamber of the braking pad 90 is provided with a small constant leak passage 94 so that when the valves 92, 93 are both closed the hydraulic pressure acting on the pad is relieved and the braking pad is held in its inoperative position by means of a light spring (not shown). The two valves 92, 93 are arranged to be operated respectively by two valve-operating pistons 95, 96, each disposed in one end of a cylinder the other end of which contains a second piston 97, 98, hereinafter called the spring abutment piston, with a compression spring 99, 100 between each of the two associated pistons which serves to maintain the associated valve 92, 93, normally closed.

One end of each of the two cylinders containing the valve operating pistons is connected respectively to the two fluid passages 101, 102, through which hydraulic fluid passes from the servo valve 103 of the turbine driven airscrew governor 14 to the airscrew pitch control mechanism of the normal type (not shown), so that with any sudden change in speed of the airscrew one or other of these passages 101, 102 will be connected to the source of hydraulic pressure 104, and the other to relief. The other end of each of the two cylinders is also connected respectively to the same one of the two passages 101, 102, but in this case through one or more restricted orifices 105, 106. A breather vent 107 communicates with the spaces between the pistons. Thus upon any sudden change in speed of the airscrew 14 resulting in a sudden rise in the pressure in one of the passages 101, 102, the associated one of the two valve control pistons 95, 96, will be moved to the right in Figure 3 against the action of its spring to open its valve 92, or 93, and thus permit hydraulic pressure to act on the braking pad 90 and check any movement of the falling boost servo piston 80. The rise in pressure will also, with some delay caused by the restricted orifices, act on the appropriate spring abutment piston 97 or 98, at the other end of the same cylinder, to compress the spring 99 or 100, and thus cause the valve 92 or 93 to close again. Thus the braking pad 90 is only applied to the falling boost servo piston immediately upon and for a brief period after a sudden rise in pressure, and, if the rise in pressure is sustained, will be released to enable the piston to move freely.

Alternatively, instead of the hydraulic pressure from the source 91 being applied to a frictional braking pad 90 as above described, it may act on a hydraulic piston, diaphragm or the like controlling a valve which closes the flow of servo fluid on one or each side of the falling boost servo piston.

It will be seen that the operation of the braking device upon a sudden rise in pressure in one of the passages 101, 102, is independent of the pressure which may exist before the sudden rise, since the springs 99, 100, will always adjust themselves to the current pressure, although with a short time lag. Moreover light springs are provided surrounding the valves 92, 93, and sufficiently strong to hold these valves in their closed positions when very small pressure rises occur such as during normal operation of the governor 14.

The gear box 6 (Figure 1) through which the internal combustion engine 1 drives the centrifugal compressor 5, is of a generally known type and may for example be of the kind described in United States Patent No. 2,483,180 including two constant mesh gear trains which are alternatively engaged by means of positive clutches, and a hydraulic coupling with an overspeed gear which causes both the main gear trains to disengage when it is itself engaged. A rotating gate, operated by the low ratio gear train prevents a gear change from being made until both the constant mesh gear trains are disengaged. In order to prevent the positive clutches from snatching at very low speeds, starting is carried out in the overspeed gear, when the cushioning effect of the hydraulic coupling absorbs the uneven engine output. In order to fulfil the requirements of the internal combustion engine, all cruising is done in the low ratio gear, but for take-off purposes and maximum power output the high gear ratio is required. The sequence of gear changes from starting to maximum power is "overspeed," "low gear," and "high gear."

An automatic hydraulic gear changer unit is included in the control system, and is shown in Figure 2. This unit is controlled directly by the pilot's lever 28 and not only effects the gear changes in the correct sequence and at the appropriate times, but also controls the servo operated valves of the control mechanism for the reheat burners 9 and the control valves for the auxiliary turbine 11 and the air balance piston 12.

The gear changer unit comprises an operating valve 120 connected to the operating arm 30 of the pilot's lever 28, a manually controlled valve 121, and two shuttle valves 122 and 123. Two servo pistons 124 and 125 are provided to operate the gear box, the piston 124 hving two operative positions in which the high and low ratio gear trains respectively are engaged, and the piston 125 also having two operative positions in which the fluid supply to the hydraulic coupling of the overspeed gear is respectively either opened or closed. Hydraulic servo fluid to operate the gear changer unit is admitted at 126, and exhaust ports 127 are provided for the relief of pressure.

When the pilot's lever 28 is in the starting or idling position to the right in Figure 2 the operating valve 120 is moved to the extreme left covering the exhaust port 127 and opening up the passage 128 to the source of hydraulic fluid 126. Hydraulic fluid is therefore allowed to flow through the passage 128, past the shuttle valve 122, and the servo piston 124, and finally exerts pressure on the right hand side of piston 125 thereby thrusting the associated gear selector rod 129 out to the left hand position shown in dotted lines in which fluid is admitted to the hydraulic coupling of the overspeed gear. As more power is required and the pilot's lever is moved further to the left, thereby moving the operating valve 120 to the right so that the valve piston 130 shuts off the passage 128 from the source of fluid pressure 126, the space to the right of servo piston 125 is connected to the exhaust port 127 via the passage 128, and the piston 125 then moves to the right under the action of a return spring 131 thereby shutting off the supply of hydraulic fluid to the hydraulic coupling of the overspeed gear. The servo piston 124 is in these conditions subject to pressure on its right hand surface being connected to the pressure source 126 via the passage 132, and the gear selector rod 133 is therefore in its left hand position corresponding to the engagement of the low gear ratio gear train. As the speed of the centrifugal compressor falls low gear is then engaged automatically.

Figure 4:
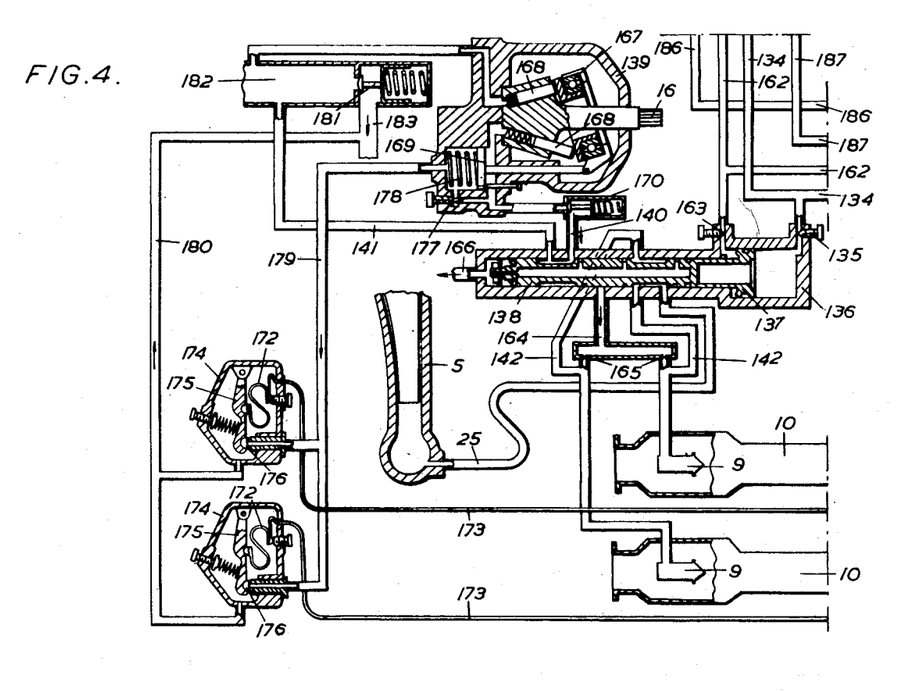
Figure 4 is a sectional view of another part of the control gear showing part of the reheater control system.

At this point in the sequence of operations the shuttle valve 123 is in its extreme right hand position as shown in Figure 2. Pressure servo fluid from the source 126 is thus fed through the pipe connection 134 to the reheat control mechanism shown in Figures 4 and 5. Pressure fluid passes through the adjustable restricted orifice 135 into the reheat servo valve chamber 136 so as to subject the right hand surface of servo piston 137 to the fluid pressure, and holds the servo valve 138 in its left hand position as shown in Figure 4. In this position of the valve 138 the fuel delivered from the continuous delivery pump 139 via the connection 140 is by-passed to a fuel return connection 141, and is thus cut off from the reheat burners 9. At the same time the valve 138 opens a connection between the air duct 25 leading from the centrifugal compressor 5, and air delivery pipes 142 which lead to the reheat burners 9. Air is thus forced through the burners, which serves not only to cool the burners, but also to eject any fuel left in the lines and burners after use and thus prevent choking of the burners with carbonised fuel.

Figure 5:
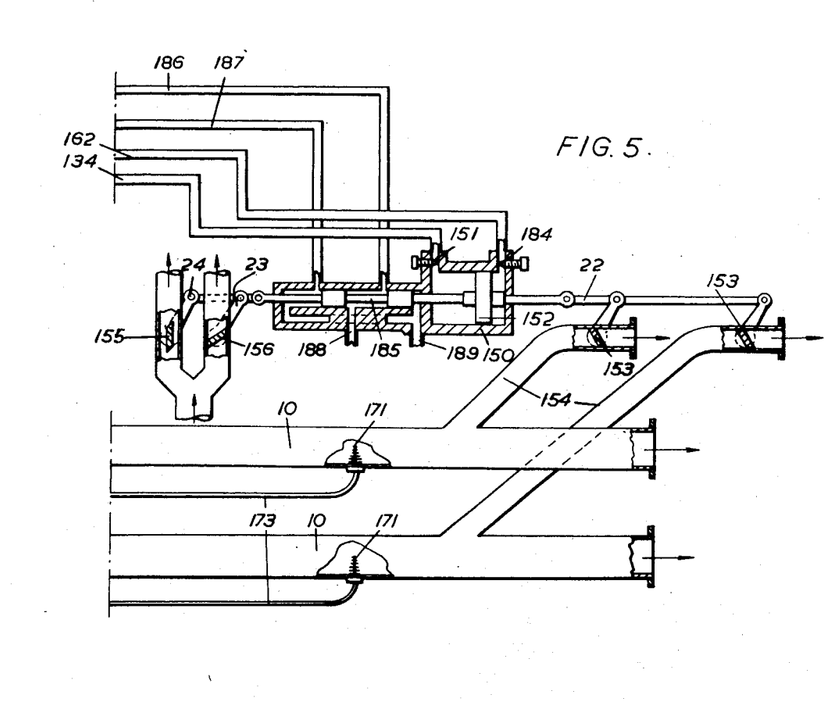
Figure 5 is a sectional view of the right hand part of the reheater control system shown in Figure 4, and Figures 6 and 7 are sectional views of the lower half of the gear change control mechanism shown in Figure 2, including alternative arrangements for controlling the valves.

Pressure servo fluid from the pipe connection 134 is also conveyed to the servo valve chamber 150 (shown in Figure 5), via the adjustable restricted orifice 151. The pressure exerted by the fluid forces the servo piston 152 to its extreme right hand position and thus by means of the operative connection 22 closes the valve gates 153 in the ducts 154 leading to the auxiliary turbine 11. The power plant, as previously explained, also includes ducts leading air from the centrifugal compressor 5 to the air balance piston 12, and for cooling purposes to the auxiliary turbine 11. The servo piston 152 is arranged to operate valve gates 155, 156, in these ducts, and as shown in Figure 5 when the piston is in its right hand position, the gate 155 in the duct leading to the air balance piston is held open by means of the linkage 24, while the gate 156 in the duct leading to the auxiliary turbine is held closed by means of the linkage 23.

Further movement of the pilot's lever 28 to the left in Figure 2 increases the power output and R. P. M. of the power plant until a stage is reached when it becomes desirable to engage the higher ratio gear train in the gear box 6 and also to bring into operation the reheat burners and the auxiliary turbine. At a predetermined point in its movement therefore the operating valve 120 in the gear change unit closes the passageway 160 by means of the valve piston 130, and thus cuts off the left hand side of shuttle valve 123 from the source of pressure fluid 126, and at the same time subjects the right hand side of the shuttle valve to pressure via the passageway 161. The shuttle valve 123 accordingly moves to the left, thereby shutting off the pipe connection 134 and opening up the pipe connection 162 to the source of pressure servo fluid 126.

Pressure fluid from the pipe 162 passes through the adjustable restriction 163 into the reheat servo valve chamber 136 and acts on the left hand side of piston 137 to force the servo valve 138 to the right. This movement of the valve shuts off the supply of air from the compressor 5 to the reheat burners 9, and at the same time connects up the fuel supply connection 140 with the fuel delivery pipe 164. Fuel is thus supplied to the reheat burners 9, the two calibrated orifices 165 ensuring that each burner receives half of the available fuel. The space on the left hand side, and the interior of the servo valve 138 are at all times connected to the atmosphere through the vent 166, which also acts as a drain for any fuel or servo fluid which may leak past the working surfaces of the valve.

The pump 139 which supplies fuel to the reheat burners is of the generally known continuous delivery variable capacity type, and by "variable capacity" it is to be understood that the quantity of fuel delivered by the pump per revolution may be varied. The pump 139 shown in Figure 4 is of the known swash-plate type, and is driven by a power take-off 16 from the internal combustion engine 1. The pump comprises a swash-plate 167 connected to the drive 16 and bearing against spring-pressed plungers 168, the attitude of the swash-plate being varied by the position of the control piston 169, which thus determines the quantity of fuel delivered by the pump per revolution. A spring-pressed valve 170 is included in the output connection from the pump in order to ensure a minimum delivery pressure, and another spring-pressed valve 181 maintains the desired pressure in the fuel line 182 supplying fuel to the pump.

It may be desirable to vary the quantity of fuel delivered to the reheat burners in accordance with the temperatures of the gases before entry to the turbines, to prevent excessively high temperatures and for this purpose the apparatus includes temperature responsive control mechanism which may be of the kind described in United States patent application No. 86,653. The control mechanism may thus comprise a small bore bulb 171 mounted in each duct 10 downstream of the reheat burners 9, and connected to a Bourdon tube 172 by means of a capillary tube 173, the three parts 171, 172, 173 forming a sealed unit which is filled with mercury at a filling pressure such as to prevent vapourisation of the mercury at temperatures below the desired working range. The pressure within the system when the bulbs 171 are subject to temperatures above the lower limit of the range is thus closely dependent upon the temperature, and is not sensitive to the ambient temperatures to which the capillary tubes 173 are exposed. Each Bourdon tube 172 is mounted in a fluid-tight casing 174, and is arranged to bear against a spring-pressed lever 175 which controls the fluid flow through a bleed valve 176.

The manner in which the temperature responsive control mechanism varies the quantity of fuel delivered by the pump 139 is as follows. Fuel delivered by the pump is fed through the variable restricted orifice 177 to the left hand side of the swash-plate control piston 169, where it acts in conjunction with a spring 178 to hold the piston to the right in Figure 4 and thus maintain a high delivery rate from the pump. The space to the left of the piston 169 is also connected by means of the pipe 179 to the control valves 176 of the temperature responsive control mechanism. If the temperature at the bulbs 171 rises above a predetermined value for any reason, the pressure in the Bourdon tubes 172 causes the tubes to expand and lift the levers 175, thereby bleeding fuel from the pipe 179 which fuel is allowed to pass to the relief pipe 183 by way of the pipe connection 180. The consequent drop in pressure on the left hand side of the swash-plate control piston 169 causes the piston to move to the left and thus changes the attitude of the swash plate thereby reducing the capacity of the pump. The resultant reduction of fuel delivered to the reheat burners 9 causes a drop in the temperature at the bulbs 171, and this reduction of fuel flow will continue until the required reduction of temperature takes place.

Pressure fluid from the pipe 162 also passes through the adjustable restriction 184 (Figure 5) to the right hand side of servo piston 152 and forces this piston to its extreme left hand position thereby operating the connection 22 to open the two valve gates 153 in the ducts leading to the auxiliary turbine. At the same time the piston 152 operates the linkages 23, 24 to close the valve gate 155 and thus stop the flow of air to the air balance piston 42 (its place being taken by the axial thrust from the auxiliary turbine), and to open the valve gate 156 thus admitting cooling air to the auxiliary turbine. The timing and sequence of movements of the two servo pistons 137, 152, may be controlled by suitable adjustments of the adjustable restrictions 163, 135, 151, 184.

When servo piston 152 has completed its movement to the left, that is to say when the auxiliary turbine is in operation, the servo valve 185 connected to the piston reverses the connections between the pipes 186, 187, and a source of hydraulic pressure 188, pipe 186 being connected to relief 189 in place of pipe 187. This reversal of pressure causes the shuttle valve 122 in the gear changer unit (Figure 2) to move to the left, and thereby connects the source of servo fluid 126 to the left hand side of piston 124 so as to urge the gear selector rod 133 to the right (corresponding to the selection of high gear). The rotating gate however, which is driven by the low ratio gear train, does not permit a gear change to take place immediately, and the pressure fluid passes on to the right hand side of piston 125 thus forcing selector rod 129 out to its left hand position in which fluid is admitted to the hydraulic coupling for the overspeed gear. This action automatically causes the clutches of both high and low ratio constant mesh gear trains to be disengaged, and thereby opens the rotary gate, which accordingly allows selector rod 133 to move to the right to engage the high ratio gear train. In moving to the right the piston 190 associated with piston 124 shuts off the supply of servo fluid to the piston 125 and the selector rod 129 accordingly moves to the right under the action of spring 131 so cutting off the supply of hydraulic fluid to the hydraulic coupling of the overspeed gear. As the speed of the centrifugal compressor 5 drops, the clutch of the high ratio gear train engages, and the power plant is then fully connected for maximum output.

When the pilot's lever 28 is moved to the right to reduce power the sequence of operations is reversed. The operating valve 120 moves to the left and valve piston 130 uncovers passageway 160 thereby admitting servo fluid to the left hand side of shuttle valve 123 which jumps to the right and reverses the flow in the pipe connections 134, 162, leading to the reheat control mechanism. Accordingly servo valve 138 moves to its left hand position shutting off the supply of fuel to the reheat burners and admitting cooling air from the centrifugal compressor 5, while servo piston 152 moves to the right so as to close the valve gates 153 in the ducts leading to the auxiliary turbine, and at the same time opens the valve gate 155 to admit air to the air balance piston and closes valve gate 156 to shut off the supply of cooling air to the auxiliary turbine. When servo valve 185 has completed its movement to the right it reverses the supply of hydraulic fluid between the pipe connections 186, 187, and causes the shuttle valve 122 to move to its right hand position. Since the gear selector rod 133 is now in its right hand position (corresponding to engagement of the high ratio gear train) servo fluid is allowed to flow to the right hand side of servo piston 192 associated with the piston 125, via the passageways 132 and 191, selector rod 133 being prevented from moving to the left by the rotary gate in the gear box. Overspeed selector rod 129 accordingly moves to its left hand position, thereby admitting hydraulic fluid to the hydraulic coupling of the overspeed gear, whereupon the rotary gate opens, and servo piston 124 travels to the left so as to engage the low ratio gear train, at the same time shutting off the supply of servo fluid to the piston 192 so that the overspeed gear disengages.

Any further movement of the pilot's lever 28 to the right will cause a reduction in the power output of the engine until eventually the piston 130 on the operating valve 120 moves to the left of the passageway 128 which is accordingly connected to the source of hydraulic servo pressure 126, and overspeed gear is engaged, whereupon the power plant may be closed down.

It will be noted that with the arrangement described the manually controlled valve 121 takes no part in the sequence of movements of the gear change unit, other than serving to blank off connection between the source of hydraulic servo fluid 126 and the extreme left and right hand sides of shuttle valve 122. If desired however the pipe connections 186, 187 may be closed or entirely dispensed with, and the valve 121 may be manually operated or connected mechanically to the operating valve 120 so as to operate the gear change selector servos.

Figure 6:
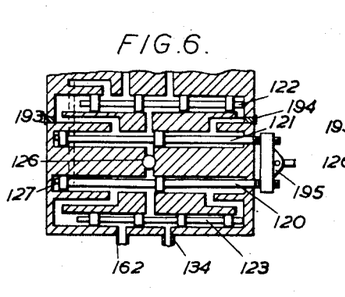

In the arrangement shown in Figure 6 which is in all other respects identical with the arrangement of Figure 2 the pipe connections 186, 187 of Figure 2 are closed by plugs 193, 194, and the two valves 120 and 121 are connected together by the cross-piece 195 and are operated from the operating arm 30 of the pilot's lever 28. In this case the shuttle valve 122 is not servo-operated from the servo valve 185 of the reheat control mechanism but is directly controlled from the pilot's lever. The relative positions of the two valves 120, 121, may be adjusted so that any desired sequence and timing of gear changes relative to control of the reheat mechanism is obtained. For example with progressive movements of the pilot's lever 28 to the left to increase power output it can be arranged that the gear change from low to high gear should occur either before or after the opening of the reheat fuel burners 9.

Figure 7:
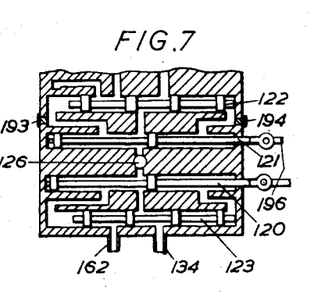

In the arrangement shown in Figure 7 the pipe connections 186, 187, are likewise dispensed with and closed by plugs 193, 194, and while the valve 120 is as before operated from the operating arm 30 of the pilot's lever 28, the valve 121 is fully manually controlled through the connecting rod 196. With this arrangement the operation of the gear change unit is under the direct independent control of the pilot, while the reheat control mechanism is automatically operated by the valve 120 controlled by the pilot's lever 28.

What we claim as our invention and desire to secure by Letters Patent is:

1. A control system for an aircraft propulsion power plant comprising a reciprocating internal combustion engine, a variable pitch airscrew driven by said engine, speed responsive governing mechanism associated with said airscrew to vary the pitch of the airscrew and thus automatically maintain the speed of the airscrew constant for any setting of the governing mechanism, a fuel control for said internal combustion engine, a turbine arranged to be driven by the exhaust gases from said engine, a compressor driven by said turbine and arranged to supply combustion air to said engine, an airscrew driven by said turbine, boost control mechanism responsive to the pressure of combustion air supplied to said engine including means for controlling automatically the speed of said turbine to maintain the combustion air supply at constant pressure for any given setting of the boost control mechanism, a movable stop device arranged to limit the movement of said boost control mechanism in the direction to increase the speed of said turbine whereby an upper speed limit of said turbine is fixed for each setting of the stop device, and a main control member arranged to control simultaneously the setting of said boost control mechanism, the setting of said fuel control for the internal combustion engine, the setting of said governing mechanism of the constant speed airscrew, and the setting of said stop device.

2. A control system for an aircraft propulsion power plant comprising a reciprocating internal combustion engine, a variable pitch airscrew driven by said engine, speed responsive governing mechanism associated with said airscrew to vary the pitch of the airscrew and thus automatically maintain the speed of the airscrew constant for any setting of the governing mechanism, a fuel control for said internal combustion engine, a turbine driven by the exhaust gas from said engine, a compressor driven by said turbine and arranged to supply combustion air to said engine, a variable pitch airscrew driven by said turbine, speed responsive governing mechanism associated with said turbine driven airscrew to vary the pitch of the airscrew and thus automatically maintain the speed of the airscrew constant for any setting of the governing mechanism, boost control mechanism responsive to the pressure of combustion air supplied to said reciprocating engine including means for controlling automatically the speed of the turbine by varying the setting of the speed responsive governing mechanism associated with the turbine driven airscrew to maintain the combustion air supply at constant pressure for any given setting of the boost control mechanism, a movable stop device arranged to limit the movement of the boost control mechanism in the direction to increase the speed of said turbine whereby an upper speed limit of said turbine is fixed for each setting of the stop device, a main control member arranged to control simultaneously the setting of said boost control mechanism, the setting of said fuel control for the internal combustion engine, the setting of said governing mechanism of the engine driven airscrew, and the setting of said stop device, said control system including secondary fuel control means responsive to the pressure of combustion air supplied to said internal combustion engine and operative to reduce automatically the supply of fuel to the internal combustion engine under conditions when said pressure cannot be maintained to the set value owing to the maximum speed limit set upon said turbine by said movable stop device, and a braking device arranged to check movements of said secondary fuel control means when sudden changes of speed of said turbine-driven airscrew occur.

3. A control system as claimed in claim 2 in which the braking device comprises a hydraulically operated braking member acting on a movable part of said secondary fuel control means, and including a source of hydraulic pressure, a hydraulic connection between said pressure source and said braking member and a control valve in said hydraulic connection which is associated with said speed responsive governing mechanism of said turbine-driven airscrew and includes means to open said valve on sudden increases of pressure due to sudden changes in the speed of said turbine-driven airscrew.

4. A control system as claimed in claim 2 in which said turbine-driven airscrew includes hydraulic operating mechanism for effecting pitch changes and the speed responsive governing mechanism comprises a speed responsive member, a source of hydraulic pressure, two hydraulic fluid lines leading to the said hydraulic operating mechanism to operate it respectively in opposite directions, and a servo valve operated by said speed responsive member to connect said source of hydraulic pressure selectively to one of the hydraulic fluid lines to said hydraulic operating mechanism when a change of pitch is required, and in which said braking device comprises a hydraulically operated braking member, a source of hydraulic pressure, and a control valve in a hydraulic connection between said pressure source and said braking member, and a pressure responsive device which is hydraulically connected to at least one of said fluid lines to said hydraulic operating mechanism and which is arranged to open said control valve on sudden increases of pressure in said fluid line due to sudden changes in the speed of said turbine-driven airscrew, said pressure responsive device normally holding said control valve in closed position.

5. A control system as claimed in claim 4 having a pressure responsive device comprising an operating piston connected to said control valve, a thrust piston, a spring separating said pistons, a hydraulic connection from one of said fluid lines to the operating piston, and a hydraulic connection including at least one restriction from said fluid line to said thrust piston, whereby gradual changes of pressure in said fluid line tend to be felt on both pistons approximately simultaneously while sudden changes of pressure are felt initially primarily on the operating piston only.

6. A control system for a power plant as claimed in claim 1 in combination with a centrifugal compressor driven mechanically from the reciprocating internal combustion engine, and arranged to receive air from the compressor driven by the turbine and to deliver it to the internal combustion engine, transmission mechanism for driving the centrifugal compressor from the internal combustion engine including selective combinations of gears providing at least two different ratios of driven to driving speeds, and gear selector mechanism controlled by said main control member having means for automatically selecting a pre-determined gear combination at each setting of said main control member.

7. A control system for a power plant as claimed in claim 6 including an auxiliary turbine in addition to the main turbine, a reheat chamber through which the exhaust gases from the internal combustion engine pass and means for supplying fuel to said chamber, ducts leading from the reheat chamber to the main turbine and to the auxiliary turbine, a valve in said last named duct, control mechanism operated by said main control member comprising means for controlling the supply of fuel to the reheat chamber and for operating said valve in the duct leading to the auxiliary turbine, and an interlock device between said gear selector mechanism and said reheating fuel supply and auxiliary turbine control mechanism preventing a change of gear combinations unless said control mechanism is in the pre-determined position appropriate for such change.

ADRIAN LESLIE CATFORD.
REGINALD HENRY DOUGLAS CHAMBERLIN.

References Cited in the file of this patent

UNITED STATES PATENTS

| Number | Name | Date |
|---|---|---|
| 2,336,844 | Buck | Dec. 14, 1943 |
| 2,401,497 | Mercier | June 4, 1946 |
| 2,468,157 | Barlow et al. | Apr. 26, 1949 |
| 2,500,860 | Penn | Mar. 14, 1950 |
| 2,565,482 | Dolza et al. | Aug. 28, 1951 |

OTHER REFERENCES

Ser. No. 281,826, Stieglitz et al. (A. P. C.), published May 18, 1943.